United States Patent

Bullough et al.

[11] 4,072,599
[45] Feb. 7, 1978

[54] CARBON ELECTRODES HAVING STABILIZED BINDERS DERIVED FROM THE ENTIRE ORGANIC FRACTION OF BITUMINOUS COAL

[75] Inventors: Vaughn L. Bullough; Luther O. Daley, both of Florence, Ala.

[73] Assignee: Reynolds Metals Company, Richmond, Va.

[21] Appl. No.: 608,645

[22] Filed: Aug. 28, 1975

[51] Int. Cl.$^2$ ............................................... C25C 7/02
[52] U.S. Cl. ...................................... 204/294; 208/8; 208/40
[58] Field of Search ....................... 204/294; 208/8, 40

[56] References Cited

U.S. PATENT DOCUMENTS

| | | | |
|---|---|---|---|
| 3,035,932 | 5/1962 | McNamara et al. ................. | 106/284 |
| 3,053,748 | 9/1962 | Morel et al. ......................... | 204/243 |
| 3,108,057 | 10/1963 | Nelson ................................. | 204/294 |
| 3,240,566 | 3/1966 | Bullough et al. ..................... | 423/449 |
| 3,660,269 | 5/1972 | McCauley ............................ | 208/8 |

*Primary Examiner*—F.C. Edmundson
*Attorney, Agent, or Firm*—Glenn, Lyne, Gibbs & Clark

[57] ABSTRACT

Carbon electrodes, either prebaked or Soderberg, made with coal or petroleum coke aggregate and an industrially stable binder that is derived from the entire organic fraction of bituminous coal and is suitable for manufacturing carbon electrodes according to existing industrial practice in the electrometallurgical industries. The binder is prepared by digesting the coal with a solvent to make a purified pitch, and industrial stability is imparted by fluxing the purified pitch at about 200°–300° C.

10 Claims, 4 Drawing Figures

CARBON ELECTRODES HAVING STABILIZED BINDERS DERIVED FROM THE ENTIRE ORGANIC FRACTION OF BITUMINOUS COAL

BACKGROUND OF THE INVENTION

1. Field of the Invention

This invention relates to carbon electrodes for the metallurgical industries. It especially relates to such electrodes containing high-purity carbonaceous binders prepared by solvent refining of bituminous coal to produce an ash-free solvent refined coal. It specifically relates to such binders having sufficient oxidative and thermal stability for incorporation in existing industrial procedures for manufacturing carbon electrodes.

2. Review of the Prior Art

In general, bituminous coal is classifiable as a bitumen only in the broadest sense and is somewhat more accurately classified along with lignite, peat, and enthracite as a non-asphaltic pyrobituminen. A true bitumen, however, is reversibly fusible (meltable). Bitumens as used industrially are more accurately defined as only the components which are soluble in carbon disulfide. Bituminous coal typically has a solubility of less than one percent in carbon disulfide.

When bituminous coals are industrially heated, pyrogenous distillates known as gas-works coal tar, coke-oven coal tar, blast-furnace coal tar, and producer-gas coal tar are isolated as by-products. These tars, which vary in composition, are characteristically liquid, oily, comparatively volatile, largely soluble in carbon disulfide, and yield water-soluble sulfonation products.

When these tars are partially evaporated or distilled, pyrogeneous residues, identified as correspondingly named pitches, are isolated. These pitches, which also vary in composition, are viscous to solid, adherent to non-adherent, comparatively non-volatile, fusible, also largely soluble in carbon disulfide, and also yield water-soluble sulfonation products.

Electrodes, such as carbon electrodes used in the electrolytic process of aluminum manufacture, have long been prepared by mixing a pitch-type binder with a graded aggregate of coke, either binder or coke being derived from petroleum or coal. Upon carbonization, this pitch is converted to carbon, thereby cementing together the coke aggregate. The type and purity of the coke generally determines the end use of the electrodes. Coal-derived pitches normally used as electrode binders have had to be subjected to severe cracking of the intermediate tar by thermal or catalytic means because such pitches (as well as coal extracts where hydrogen is not used) have notoriously unstable viscosities so that a catalytic or high-temperature cracking step was needed in order to maintain a workable viscosity during industrial manufacture of either Soderberg or prebaked electrodes. This situation is believed to be caused by the presence of unstable free radicals in low-temperature tars that are stabilized only by such cracking or by the presence of hydrogen.

Such stabilization is believed to be but a portion of the processing required for making the commonly used pitch binders of the prior art including bitumens, asphalts, coal tar pitch, oil tar pitch, tars, resins, gilsonite, and the like, as taught in U.S. Pat. No. 2,998,375, by distillation, cracking, solvent extraction, concentration, and the like, this processing being necessary because of the complexity, heterogeneity, and unpredictability of the chemical structure of coals. For example, during the 1950's there was a predominant theory for electrode binders that associated the quality of a binder with the amount soluble in various solvents, e.g., benzene and quinoline, so that specifications for electrode binders are still being written that specify the maximums or minimums of certain soluble fractions.

Softening point reduction to about 32°–38° C. for coal-tar hard pitch (distillation residue) is taught in U.S. Pat. No. 2,297,455 by addition thereto of 40–50% of anthracene oil, benzene wash oil, coal tar oil, and the like and heating for several hours without removing the additive to produce a pitch that is comparable to petroleum asphalt as to low-temperature shock sensitivity.

Coal-tar pitch, the most commonly used binder, is classified in U.S. Pat. No. 2,683,107 into four fractions differing with respect to adhesiveness and solubility in itself and in organic solvents. The fraction which is insoluble in itself is present as suspended solids. This fraction is removed by heating the pitch to temperatures between 150° C. and 400° C. and filtering or by dissolving the coal tar pitch in a high-boiling aromatic solvent and filtering. The filtrate, after removal of solvent if used, may be maintained at temperatures between about 400° C. and 525° C. until it has a softening point between about 85° C. and about 125° C.

Removal of these suspended solids permits the binder, as an impregnating material, to flow into the pores of a carbonaceous body without plugging by the suspended solids so that densified carbon or graphite electrodes can be prepared. Such removal does not affect the reactivity of carbon electrodes as long as the insoluble material is less than about 15 percent by weight and is not inorganic in nature.

A coal-solution process is taught in U.S. Pat. No. 3,240,566 for removing ash from coal to produce a substantially ash-free carbon which can be used in the manufacture of carbon electrodes suitable for the electrometallurgical industries. In this process, an extracting oil is mixed with crushed and dried bituminous coal, in a weight ratio from about 1:1 to about 6:1, and the mixture is digested, separated by centrifuging, concentrated, and coked. The extracting oil is an aromatic liquid hydrocarbon creosote oil-type solvent, such as high-boiling anthracene oil fractions.

After distilling a light oil from the digested coal, two-stage centrifuging is used to remove the ash. The first overflow is solvent refined coal as a coal solution from which 75–85% thereof is removed as a creosote type aromatic hydrocarbon before coking at 550°–700° C. The removed hydrocarbon is suitable as the initial solvent for the digestion. Cokes made from Kentucky and Alabama coals, after calcining at 1340° C., had 0.58% and 0.76% ash, respectively.

In the process of U.S. Pat. No. 3,562,783, non-caking coal is digested at 350°–400° C. with a solvent derived from the coal itself. About 30–40% of the coal plus about 5% of coal-reacted and polymerized solvent is recovered as a non-distillable pitch binder for making form coke which is used as part of a blast furnace charge. The binder is not stabilized against oxidative or thermal polymerization, although such pitches have notoriously unstable viscosities.

In U.S. Pat. No. 3,801,342, a process is disclosed for upgrading lignite binder pitches which are produced firstly by low temperature carbonization of lignite to form a tar and a char residue, secondly by distillation of the tar to produce lignite pitches, thirdly by delayed coking or thermal cracking of the lignite pitches to produce an oil, and fourthly by distillation of this oil to leave a pitch residue which is suitable as a binder for carbon electrodes. In this upgrading process, such low-temperature pitch residue is extracted with saturated aliphatic hydrocarbons having 7-9 carbon atoms to leave an aliphatics-free binder pitch which, when combined with lignite coke, makes carbon electrodes having lower electrical resistivity and substantially higher physical strength as compared to similar electrodes containing such aliphatics.

In the art of manufacturing carbon electrodes, the binder must be stable by itself and in mixtures with other carbonaceous materials when at elevated temperatures (150° C. to 170° C.) for prolonged period of time. Attempting to use an oxidatively or thermally unstable binder results in severe mechanical problems and can break down the entire manufacturing process. Such stability principally manifests itself as good viscosity stability which is important both for holding the binder in heated liquid storage and for stable rheological behavior in operations using Soderberg anodes.

Moreover, the coke must be heated at high temperatures (approximately 1,200° C.) before adding the binder and manufacturing the carbon paste. This heat treatment is necessary in order to provide adequate electrical conductivity and to pre-shrink the carbonaceous material and thus prevent shrinkage and distortion within the formed electrode. In the form coke process, in contrast, such pre-shrinkage is not necessary. Indeed, it is not even desirable to separate the aggregate and binder before forming the article unless the coke has such poor agglomerating properties as to require external extraction and reformation of the binder.

Because carbon electrodes are a basic necessity for the electrometallurgical industries, it is highly desirable that they can be manufactured by customary industrial procedures with any available coke aggregate and a binder that is made from a bituminous coal as a primary product, not as a by-product whose supply is based upon other industrial requirements. In consequence, a process for making such a coal-derived binder must include a means for imparting oxidative and thermal stability to the pitches so that they can be satisfactorily incorporated into existing processes for manufacturing carbon electrodes, either when used alone or as a blend with other industrially proven binders.

SUMMARY OF THE INVENTION

It is accordingly the object of this invention to provide carbon electrodes for the electrometallurgical industries that are made from a coal or petroleum coke and an industrially stabilized binder that is derived from the entire organic fraction of bituminous coal.

It is an additional object to provide a process making a pitch-type binder, as a primary product from bituminous coal, that is suitable as to purity, strength requirements, and both oxidative and thermal stability for making carbon electrodes useful in the metallurgical industries.

In accordance with these objects and the spirit of this invention, carbon electrodes are herein provided that incorporate a binder prepared from a solvent refined coal without thermal or industrial cracking thereof as has long been firmly believed to be absolutely necessary. This binder is derived from the entire organic fraction of a bituminous coal. It is industrially stabilized by a process that involves fluxing the solvent refined coal with a minor amount of solvent for several minutes at elevated temperatures, such as 200°-300° C.

Beginning with a pulverized bituminous coal, the solvent refining and stabilizing process comprises digesting the coal with a solvent to form a fluid solution, removing the insoluble inorganic material from the fluid solution to form a purified solution, selectively removing a portion of the solvent from the purified solution to form a solvent refined pitch, and selectively heat treating the pitch to form a stable binder that is suitable for mixing with carbonaceous aggregates under industrial manufacturing conditions for making metallurgical-grade carbon electrodes.

The digestion process is generally known, as disclosed in U.S. Pat. No. 3,240,566, and involves temperatures of about 400° C. at pressures of 1,000-2,000 psi for 30-60 minutes. Under these conditions, there is some decomposition of coal. Water, methane, and hydrogen sulfide are generated as well as many other hydrocarbons. Some polymerization of the molecular fragments generated from dehydration occurs during solution, and the amount of this polymerization can be effectively terminated by the presence of hydrogen during the digestion. This hydrogen can be present as molecular hydrogen or in the form of a hydrogen donating solvent (e.g., tetrahydronaphthalene). The yields of different compounds and the molecular size range will be affected by the temperature, pressure, and amount of hydrogen present. The mineral matter present in the coal is adequate to catalyze the mild amount of hydrogenation that is needed to prevent an excessive amount of polymerization.

DESCRIPTION OF THE INVENTION

Solvent refined coal which is commercially produced according to the process disclosed in U.S. Pat. No. 3,240,566, which is herein incorporated by reference, is hard and non-adherent. Its properties are approximately as follows when prepared by solvent digestion of bituminous coal with 1.0% added hydrogen on a weight basis:

| | |
|---|---|
| Specific Gravity | 1.25 gr/cc. |
| Total Sulfer | 1.0 wt% (max) |
| Nitrogen | 1.8-2.0 wt% (max) |
| Ash | 0.1 wt% |
| Softening Point (Ring & Ball) | 170° C. |
| Conradson Carbon | 61.2 wt% |
| Viscosity | |
| a. 500° F. | 500-5,000 Cps |
| B. 550° F. | 140-300 Cps |
| c. 600° F. | 55-80 Cps |
| Benzene Insoluble | 33 wt% |
| Pentane Insoluble | 0.6 wt% |
| SRC Ultimate (Approx.) | |
| a. C | 88.41 wt% |

-continued

| | |
|---|---|
| b. H | 5.15 wt% |
| c. N | 1.84 wt% |
| d. S | 0.78 wt% |
| e. O | 3.72 wt% |
| f. Ash | 0.10 wt% |
| | 100.00 |

The properties of a pitch-type binder that are required for making metallurgical electrodes are approximately as follows:

| | |
|---|---|
| Coking Value-Conradson | 50 wt% min. |
| Softening Point (Cube in Air) | 95–120° C. |
| Benzene Insoluble | 28 wt% min. |
| Quinoline Insoluble | 5–10 wt% |
| Specific Gravity | 1.30 Gr/cc. |
| Distillation (0–360° C.) | 6% max. |
| Ash | 0.1 wt% max. |

EXAMPLE 1

A solvent refined coal, as small particles, was mixed with coke aggregate in an attempt to prepare an anode paste to be made into prebaked carbon anodes, but the particles did not completely melt in the mixer at 225° C. The particles reached the plastic state, stuck together, and became hard without wetting or mixing with the coke aggregate. The attempt was unsuccessful.

EXAMPLE 2

A stabilized binder was made by mixing equal parts by weight of a solvent refined coal with a cathode pitch having a softening point of 60° C. and by fluxing the mixture for 15 minutes in an oven at 300° C. The binder was satisfactory for making prebaked carbon anodes according to industrial practice.

EXAMPLE 3

Certain physical properties of comparable prebake samples which were made with this binder and with a commercial binder for the same coke aggregate were ascertained as follows:

| | Binder Fluxed with Cathode Pitch, 19% by Weight | Commercial Binder, 16% by Weight |
|---|---|---|
| Apparent Density, gms/cc | 1.49 | 1.54 |
| Resistivity, ohms/m/mm$^2$ | 61 | 66 |

EXAMPLE 4

Figure 3:
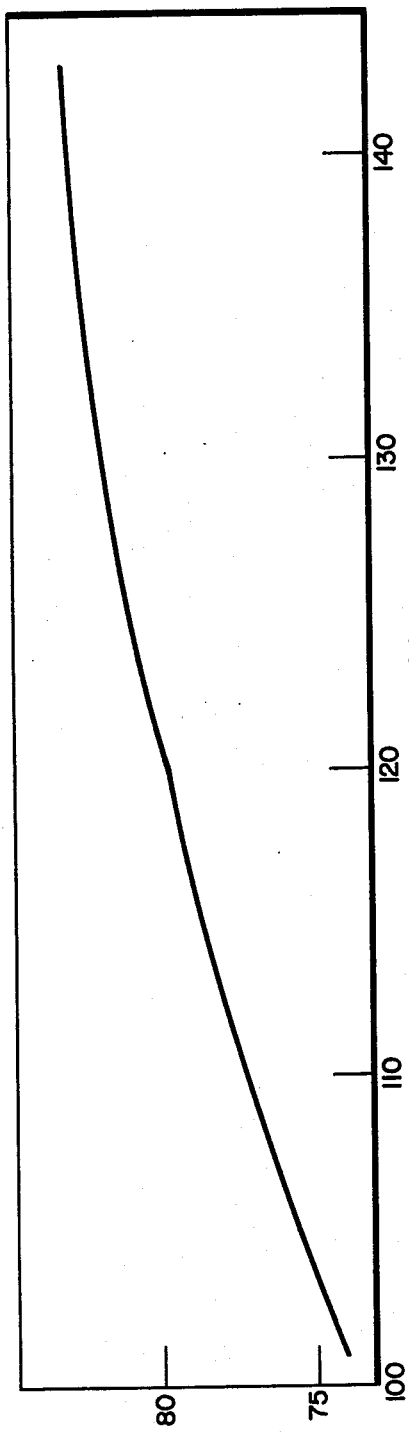
FIG. 3 is a graph showing the softening points for industrially stable binders made from various proportions of solvent refined pitch and anthracene oil as solvent.
Figure 4:
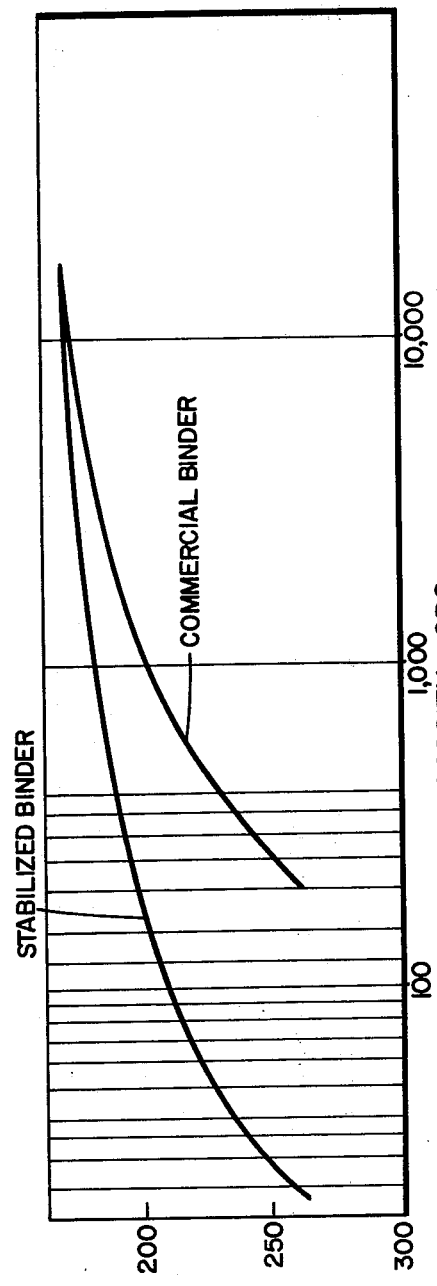
FIG. 4 is a graph showing the viscosities over an industrially useful range of temperature for an industrially stabilized binder and a commercial coal tar pitch.

Seven stabilized binders were made by fluxing 71%–83% of a solvent refined coal with anthracene oil. The softening points of these binders, ranging from 101° C. to 143° C., are shown graphically in FIG. 3, and the viscosities are shown in FIG. 4 according to the following data:

| Stabilized binder containing 77% solvent refined coal and 23% anthracene oil | | Commercial binder having softening point of 120° C. | |
|---|---|---|---|
| Temp., ° C. | Viscosity, cp | Temp., ° C. | Viscosity, cp |
| 254 | 25 | 250 | 250 |
| 205 | 136 | 201 | 1,030 |

-continued

| Stabilized binder containing 77% solvent refined coal and 23% anthracene oil | | Commercial binder having softening point of 120° C. | |
|---|---|---|---|
| Temp., ° C. | Viscosity, cp | Temp., ° C. | Viscosity, cp |
| 169 | 12,600 | 169 | 12,750 |

Some of these binders were fluxed on a hot plate, and others were fluxed in an oven at 180°–250° C.

EXAMPLE 5

Prebake carbon samples were made by mixing a coke aggregate with 18% by weight of a stabilized binder, prepared similarly to the binder of Example 3 and containing 17% anthracene oil. The test results for these samples are as follows:

| | |
|---|---|
| Apparent density, gms/cc | 1.51 |
| Resistivity, ohms/m/mm$^2$ | 66 |
| Crush strength, psi | 5,093 |

As far as is known, metallurgical-grade electrodes had never before been manufactured from a coke aggregate and a stabilized binder made from the entire organic fraction of a bituminous coal without cracking thereof. As indicated by the thermograms in FIGS. 1 and 2, this binder (FIG. 1) and the commercial binder (FIG. 2) were clearly comparable.

Figure 1:
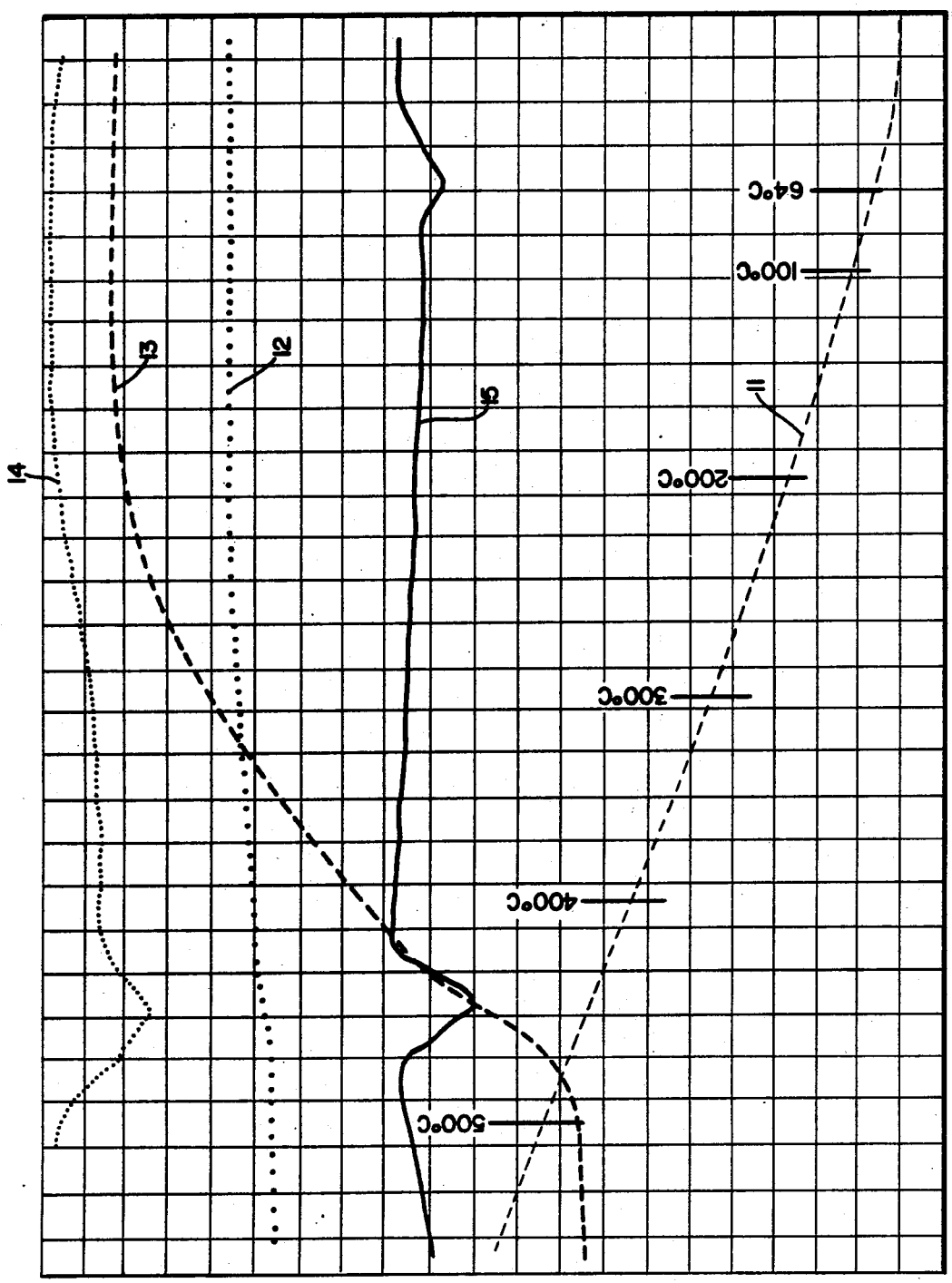
FIG. 1 is a thermogram for an industrially stabilized pitch derived from all of the organic materials in a bituminous coal.

In FIG. 1, weight loss at 100 mg/in, for temperatures indicated by curve 11, is shown by curve 12 and at 10 mg/in. by curve 13. Differential thermal gravimetric analysis as the first derivative of weight change is recorded as curve 14 at 25 mg/min. Using Al$_2$O$_3$ as reference, differential thermal analysis at 200 $\mu$V is given by curve 15.

Figure 2:
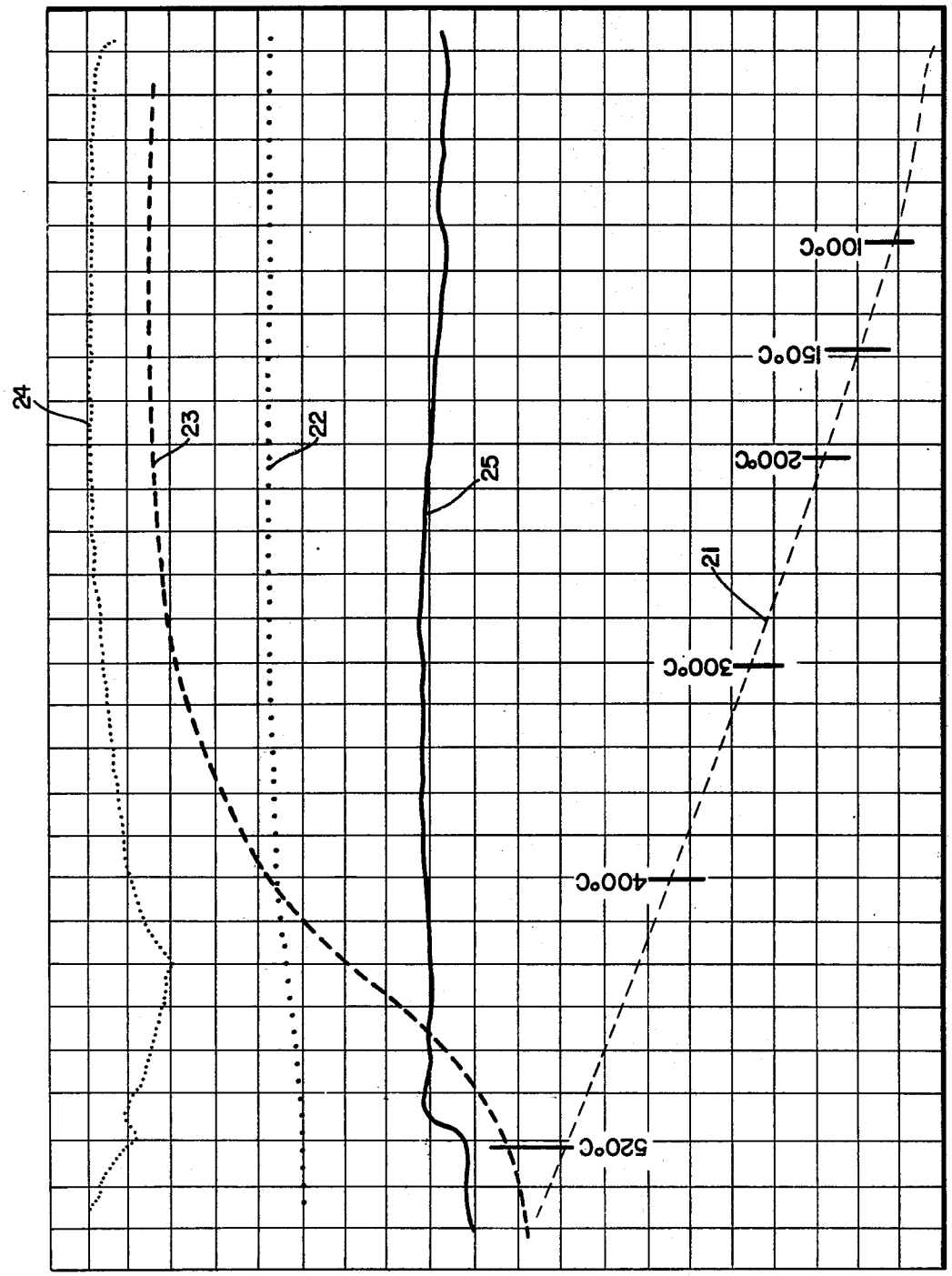
FIG. 2 is a similar thermogram for a commercial coal tar pitch used as a binder in manufacturing carbon electrodes.

In FIG. 2, weight loss at 100 mg/in, for temperatures indicated by curve 21, is indicated by curve 22 and at 10 mg/in by curve 23. Differential thermal gravimetric analysis, as the first derivative of weight change, is recorded as curve 14 at 25 mg/min. Also using Al$_2$O$_3$ as reference, differential thermal analysis at 200 $\mu$v is given by curve 25.

FIG. 1 indicates that no endothermic or exothermic change (molecular rearrangement) took place below about 450° C., and FIG. 2 indicates that molecular rearrangement occurred at about 509° C. These thermograms demonstrate the wide range of thermal stability that is needed for manufacturing carbon electrodes by existing industrial processes.

EXAMPLE 6

Comparable prebake carbon samples were made by mixing a coke aggregate with 16% weight percent stabilized binder and with 16% weight percent commercial binder having 120° C. softening point. Crush strengths and electrolytic burning rates were determined in air and in CO$_2$. Typical test results, based on several electrode samples, are given in Table I. The test samples were observed to be "soft" while being cored and machined.

TABLE I

| BINDER | Stabilized, 25% By Weight | Commercial, 25% By Weight |
|---|---|---|
| Resistivity, ohms/m/mm$^2$ | 64 | 60 |
| Apparent density, g/cc | 1.53 | 1.56 |
| Crush strength, psi | 4,456 | 6,843 |
| Burning, electrolytic, % | 112.4 | 112.3 |
| Burning in air, mg/hr/cm$^2$ | 42 | 38 |

TABLE I-continued

| BINDER | Stabilized, 25% By Weight | Commercial, 25% By Weight |
|---|---|---|
| Slough, mg/cm² | 160 | 102 |
| Total, mg/cm² | 326.8 | 252.3 |
| Burning in CO₂, mg/hr/cm² | 23 | 36 |
| Slough, mg/cm² | 38 | 58 |
| Total, mg/cm² | 84.4 | 129.3 |

EXAMPLE 7

Comparable Soderberg anode samples were made with an industrially stabilized binder, prepared from 77% solvent refined coal and 23% anthracene oil, and with the same commercial binder, having a softening point of 120° C., which was utilized in the tests of Examples 2–6, all samples containing 25% binder by weight. Crush strengths and electrolytic burning rates were determined in air and in $CO_2$. Typical test results, based on several electrode samples, are given in Table II.

TABLE II

| Binder | Stabilized, 25% By Weight | Commercial, 25% By Weight |
|---|---|---|
| Resistivity, ohms/m/mm² | 64 | 59 |
| Apparent density, g/cc | 1.49 | 1.57 |
| Crush strength, psi | 5,758 | 6,684 |
| Burning, electrolytic, % | 121.3 | 111.5 |
| Burning in air, mg/hr/cm² | 45 | 42 |
| Slough, mg/cm² | 258 | 85 |
| Total, mg/cm² | 438.1 | 253.6 |
| Burning in CO₂, mg/hr/cm² | 13 | 12 |
| Slough, mg/cm² | 22 | 13 |
| Total, mg/cm² | 47.7 | 37.9 |

EXAMPLE 8

A solvent refined coal, made from bituminous coal produced from the Number 11 coal seam in Western Kentucky and having a softening point of 175° C., was fluxed with 16.7 percent anthracene oil to prepare an industrially stabilized binder. A suitable aggregate of petroleum coke was mixed at 170° C. with this stabilized binder to make a paste containing 18% binder. The paste was pressed to form test electrodes which were baked for 48 hours in a laboratory baking furnace to a temperature of 1,200° C. These test electrodes had an apparent density of 1.53 gms/cc, an electrical resistivity of 64 ohms/m/mm², and a compression strength of 5,100 lbs/in². These properties are comparable to test electrodes prepared with commercial coal tar pitch under the same circumstances.

EXAMPLE 9

A solvent refined coal is fluxed with 17 percent anthracene oil to make a stabilized binder which is mixed at 170° C. with a coal-derived coke and with a commercial coal-tar pitch in a ratio of 7 percent stabilized binder, 83 percent coke, and 10 percent coal-tar pitch, on a weight basis, to produce a paste which is then pressed to form a test Soderberg anode. After baking to 1,200° C., this anode is tested and is found to have properties comparable to similar Prebake test electrodes made entirely with commercial coal-tar pitch.

EXAMPLE 10

A stabilized binder made from solvent refined coal was held melted at 170° C. in the presence of air for 112 days, and the softening point, which is a direct index of viscosity, was measured at intervals. The 5° increase in softening point, as shown in the following table, indicates a very good degree of stability that is well within the range of normal manufacturing variability.

| Days Elapsed at 170° C. Storage in Air | Softening Point, ° C. |
|---|---|
| 0 | 108.4 |
| 14 | 109.5 |
| 28 | 111.1 |
| 52 | 112.1 |
| 63 | 112.1 |
| 70 | 112.4 |
| 77 | 112.5 |
| 94 | 113.2 |
| 112 | 113.4 |

Because various modifications and changes in addition to those described hereinbefore may be made without departing from the spirit and object of the invention, it is to be understood that the invention is to be construed only according to the scope of the following claims.

What is claimed is:

1. A carbon electrode for use in electrometallurgical manufacturing which consists essentially of a coke aggregate and a stabilized binder having a softening point between about 100° and 150° C that is prepared by heat-treating a concentrated solution of all of the low-volatile organic materials in a bituminous coal, said concentrated solution containing 16–30% of an aromatic liquid hydrocarbon creosote-oil type solvent for said organic materials.

2. The carbon electrode of claim 1 wherein said heat-treating comprises fluxing said concentrated solution in air at 160°–310° C so that said binder is oxidatively and thermally stabilized and is suitable for making metallurgical electrodes according to industrial practice.

3. The carbon electrode of claim 2 wherein said binder is prepared by solvent refining said bituminous coal by the steps of digesting said coal with said solvent to form a fluid solution and by removing the insoluble inorganic material from said fluid solution to form a purified solution.

4. The carbon electrode of claim 3 wherein said purified solution is concentrated by removing at least a portion of said solvent from said purified solution to form a solvent refined pitch, as said concentrated solution, whereby high-volatile organic materials are removed from said solvent.

5. The carbon electrodes of claim 4 wherein said stabilized binder undergoes no significant degree of molecular rearrangement below about 450° C.

6. The carbon electrodes of claim 4 wherein said stabilized binder undergoes no more than about a 5° increase in the softening point thereof during storage at about 170° C. while exposed to air.

7. In the industrial manufacture of carbon electrodes from a coke aggregate and a binder to form a paste which is baked to about 1,200° C in approximately 48 hours to form said electrodes, the improvement comprising the preparation of said binder from substantially all of the low-volatile organic materials in a bituminous coal by solvent refining said coal in the presence of hydrogen to form a pitch containing 16–30 percent of an aromatic liquid hydrocarbon creosote-oil type solvent and by thermally and oxidatively stabilizing said pitch by fluxing said pitch in air at 160°–310° C.

8. A carbon electrode for use in electrometallurgical manufacturing which consists essentially of a carbonaceous aggregate and a stabilized binder which is derived from the entire low-volatile organic fraction of a bituminous coal without thermal or catalytic cracking thereof, which undergoes no more than about a 5° increase in the softening point thereof during storage at about 170° C while exposed to air, and which is oxidatively and thermally stabilized so that it is suitable for mixing with said carbonaceous aggregate for making metallurgical-grade carbon electrodes, said stabilized binder being prepared by:

A. admixing a solvent, selected from the group consisting of anthracene oil and cathode pitch having a softening point of about 60° C, with 70–85% of a solvent refined coal to form a binder mixture; and B. selectively heat treating said binder mixture without molecular rearrangement thereof to form said stabilized binder.

9. The carbon electrode of claim 8, wherein said heat treating comprises fluxing said binder mixture in air at a temperature of 180°–300° C.

10. The carbon electrode of claim 9 wherein said solvent refined coal is mixed with 17–23% of said anthracene oil prior to said fluxing.

* * * * *